United States Patent
Revol et al.

(10) Patent No.: US 7,192,466 B2
(45) Date of Patent: Mar. 20, 2007

(54) METHOD FOR PREPARING NUCLEAR METAL OR METAL ALLOY PARTICLES

(75) Inventors: Stephane Revol, Pommiers-la-Placette (FR); Regis Baccino, Saint-Martin-d'Uriage (FR)

(73) Assignees: Framatome Anp, Courbevoie (FR); Compagnie pour l'etude et la Realisation de Tour Fiat, Courbevoie (FR)

( * ) Notice: Subject to any disclaimer, the term of this patent is extended or adjusted under 35 U.S.C. 154(b) by 155 days.

(21) Appl. No.: 10/363,672

(22) PCT Filed: Sep. 20, 2001

(86) PCT No.: PCT/FR01/02926

§ 371 (c)(1),
(2), (4) Date: Mar. 6, 2003

(87) PCT Pub. No.: WO02/24384

PCT Pub. Date: Mar. 28, 2002

(65) Prior Publication Data

US 2003/0172776 A1    Sep. 18, 2003

(30) Foreign Application Priority Data

Sep. 21, 2000   (FR) ..................... 00 12046

(51) Int. Cl.
    B22F 9/10    (2006.01)
(52) U.S. Cl. .............. 75/333; 75/338; 75/344; 266/202

(58) Field of Classification Search .................. 75/333, 75/338, 344; 266/202; 425/7
See application file for complete search history.

(56) References Cited

U.S. PATENT DOCUMENTS

| | | | |
|---|---|---|---|
| 2,356,899 A | | 8/1944 | Landgraf |
| 4,402,885 A | * | 9/1983 | Roehrig et al. .............. 75/337 |
| 4,416,600 A | * | 11/1983 | Lecznar et al. .............. 425/7 |
| 4,780,130 A | * | 10/1988 | Raman et al. ............... 75/338 |
| 4,869,469 A | * | 9/1989 | Eylon et al. ................ 266/202 |
| 5,738,705 A | * | 4/1998 | Anderson et al. ............ 75/332 |
| 5,978,432 A | | 11/1999 | Kim et al. |

FOREIGN PATENT DOCUMENTS

| | | |
|---|---|---|
| JP | 55054508 | 4/1980 |
| JP | 01052006 | 8/1987 |

* cited by examiner

Primary Examiner—George Wyszomierski
(74) Attorney, Agent, or Firm—Foley & Lardner LLP

(57) ABSTRACT

Nuclear metal or alloy particle preparation method and device; said device comprising:
- means to prepare a fluid mass of the metal or alloy by melting;
- means to put the fluid mass of the metal or metal alloy in the form of a molten metal or alloy stream;
- means to impart a centrifugal rotation movement to a quenching fluid and carry out the atomisation of the molten metal or metal alloy stream particles and the quick quenching of the particles;
- means to melt the nuclear metal or metal alloy in an inert gas atmosphere, and means to surround the molten metal or metal alloy stream by a neutral gas envelope until quenching.

13 Claims, 1 Drawing Sheet

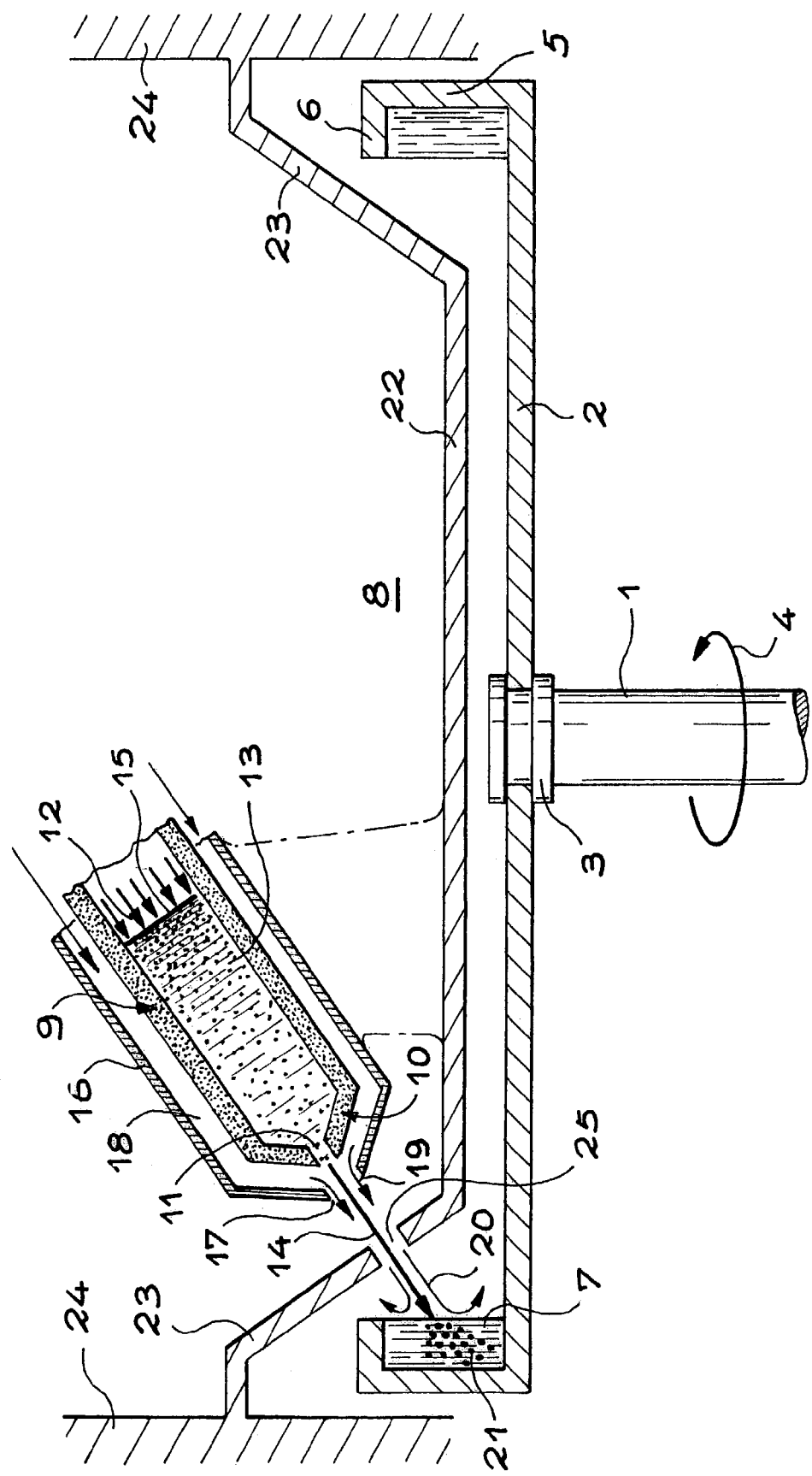

METHOD FOR PREPARING NUCLEAR METAL OR METAL ALLOY PARTICLES

DISCLOSURE

The invention relates to a method to prepare nuclear metal or metal alloy particles, particularly a powder, the invention particularly applies to the preparation of a UMo alloy powder.

In the nuclear industry, numerous metals or metal alloys must be prepared in powder form.

In this way, in particular, the nuclear industry develops new low enrichment fuels offering easy reprocessing. These fuels are particularly presented in the form of a metal matrix composite. The alloys used in these fuels must be prepared in the form of fine powders to be able to be mixed with a high thermal conductivity material, such as aluminium for example.

An alloy which meets all the requirements expressed for use in said fuels is UMo.

Numerous methods can be used to prepare nuclear metal or alloy powders such as UMo.

However, first of all, it is important to note that the grinding techniques widely used for silicide fuels are not transposable to metals or strictly metal alloys, such as UMo.

Therefore, the production of nuclear metal or alloy powders, such as UMo, can be carried out at the present time by means of different methods, none of which have proved to be satisfactory for industrial powder production.

In this way, the rotary plate atomisation method generates a completely spherical powder with very low oxygen contamination.

Such a method is disclosed in the document U.S. Pat. No. 5,978,432 by C. K. KIM et al.

In order to prepare a uranium alloy, for example a uranium alloy containing 8% of molybdenum by weight, the uranium and the alloy element are weighed and placed in a crucible heated by a high frequency generator. When the temperature is sufficiently high, the molten metal mass is poured through an orifice on a rotary disk located in a vacuum atomisation confinement. The rotation speed of the rotary disk is approximately 30,000 rpm.

The molten mass is divided by the centrifugal force of the rotary disk and forms fine droplets which fly, through a coolant gas, towards the wall of the confinement. The atomised powder is retrieved in a tank located at the base of the confinement. The powder is then mixed with the aluminium powder and compressed to prepare the nuclear fuel.

This method is a very high-performance and sensitive method, which involves significant drawbacks during operation, which are, among other things: the fact that the atomisation is carried out in a vacuum confinement, the large size of the device which does not allow safe geometry operation, the significant retention possibilities associated with difficult cleaning of the machine which renders safe mass operation difficult, and extremely delicate operation.

In addition, the use of a rotary plate at very high speeds of up to approximately 30,000 rpm and up to 50,000 rpm in nuclear environments, is a significant constraint.

According to another Canadian method, the powder can be obtained by machining chips, which are then processed to modify their morphology by removing the sharp angles. This type of method induces very high iron, carbide or nitride powder contamination, for example, which is inevitable to have adverse effects on the final properties of the fuel.

Other methods to obtain the powder by means of chemical methods exist, such as the Argentinian hydridation-dehydridation method. In this case, the particle size of the powder is difficult to control, leading to reproducibility problems for industrialisation. Significant contamination may also be introduced into the powder during this treatment.

The use of conventional water or gas atomisation methods results in the use of installations, involving numerous drawbacks for the atomisation of nuclear substances, among other things, very large sizes, numerous retention possibilities and complex operation. These methods are well-adapted to the production of large quantities of powder, by casting, which is prohibited for nuclear substances, where the application of criticality rules results in a limitation of the quantity of material that can be converted into powder by casting to a few kilograms.

In other words, conventional atomisation methods are methods which are poorly suited to the production of low quantities of powders since a steady state must be obtained, which requires operation in a transient state for a non-negligible period. In any case, the development of this type of installation is delicate.

The document JP A 55 054508 discloses a device, wherein molten metal contained in a crucible falls gravitationally through an orifice provided at the base of said crucible, into a tank which rotates at a high speed.

The molten metal falls into the reservoir along the direction of rotation of a coolant, such as water, and then collides with said coolant and is dispersed on its surface.

The molten metal is thus absorbed in the coolant and is accelerated further by the centrifugal force, by means of which, it is cooled rapidly (quenched) to become the metal powder.

During this operation, an inert gas is sent through supply orifices located in the hollow rotation shaft of the tank, to prevent the oxidation of the molten metal.

It is not mentioned in this document that the melting itself inside the crucible is conducted in an inert gas atmosphere.

Similarly, it cannot be considered that the inert gas forms a envelope surrounding the molten metal flow, but rather that the molten metal flow (which is not a stream) is introduced into confinements filled with inert gas.

Finally, a metal stream is not formed but a simple molten metal flow is created under the simple action of gravity.

Definitively, the various existing techniques or those under development do not offer satisfactory preparation conditions to manufacture nuclear metal or alloy powder, such as UMo, industrially.

Indeed, such a method to manufacture nuclear metal or alloy powder, such as UMo, particularly intended to manufacture nuclear fuel must meet a large number of criteria and comply with numerous constraints and resolve a series of problems.

Some of the criteria, constraints and problems are due to the nuclear nature of the metal or alloy.

Only a small quantity of material per casting, i.e. generally approximately a few kilograms, must be atomised due to criticality constraints;

the cycle time to carry out a casting must, as a result, be short and the method must be stabilised to minimise losses;

it is necessary to avoid any retention of nuclear material in the installation (again due to criticality constraints), hence the interest of simple and compact installations with a precise indication of the position of the nuclear material and its quantity, at all times;

finally, it is necessary to limit the quantity of effluent produced to the strict minimum.

Other problems, criteria and constraints are more related to the fact that the powder prepared is used to produce nuclear fuels in metal matrix composite form, therefore, it is necessary:

not to have significant contamination of the powder, for example by oxygen ; indeed uranium and its alloys are particularly, highly oxidisable, or even pyrophoric ;

to obtain a powder with a narrow particle size distribution.

None of the methods described above meet all these criteria and constraints at the same time.

In this way, for example, the existing water atomisation methods, which make it possible to obtain a non-spherical powder and high cooling rates, and therefore compact sizes, due to the absence of a cooling tower, cannot unfortunately be used to prepare nuclear metal or metal alloy powders since they particularly induce:

high oxygen contamination of the powder;

vapour explosion risks, related to the simultaneous presence of molten alloy and water;

criticality risks related to the simultaneous presence of large quantities of water and nuclear material.

Therefore, there is a need not yet met for a method to prepare a metal or metal alloy powder which complies with all the constraints, meets all the criteria and requirements defined above, does not have the drawbacks, faults, disadvantages, limitations of the methods of the prior art and resolves the problems mentioned above of the methods of the prior art.

The aim of the present invention is to provide a method meeting, among other things, these requirements.

This aim and other further aims are achieved, according to the invention, by a method to prepare nuclear metal or metal alloy particles, wherein the following steps are carried out:

a fluid mass of the metal or metal alloy is prepared by melting;

the fluid mass of the metal or metal alloy is put in the form of a molten metal or metal alloy stream by ejecting the fluid mass of metal or alloy through a nozzle;

the stream is brought into contact with a quenching fluid imparted with a centrifugal rotation movement, by means of which the atomisation of the molten metal or metal alloy stream into particles and the quick quenching of the particles are carried out;

the melting being carried out in an inert gas atmosphere, and the molten metal or metal alloy stream being surrounded by an inert gas envelope (sheath) until atomisation.

According to the invention, the fluid mass of the metal or metal alloy is put in the form of a metal or metal alloy stream by ejecting the fluid mass of metal or alloy through a nozzle, which is fundamentally different to the prior art where a simple gravitational flow of the molten metal or metal alloy is used.

The inert gas envelope or sheath surrounding the molten metal or metal alloy stream is advantageously formed by ejecting, expelling the inert gas through an orifice, preferentially circular, surrounding the orifice of the nozzle simultaneously with respect to the ejection, expulsion of the metal or metal alloy stream through said nozzle.

Preferentially, said orifice is centred on the nozzle or, more exactly, on the nozzle orifice.

Advantageously, the quantity of quenching fluid, used for the atomisation, is a low and finite quantity, generally less than or equal to two litres.

Advantageously, the quenching fluid is water or liquid argon.

Preferentially, the area wherein melting takes place and the area wherein atomisation takes place are physically separated.

The method according to the invention makes it possible for the first time, at an industrial scale, to produce particles, particularly of a nuclear metal or alloy powder, meeting all the criteria and complying with all the constraints mentioned above.

In particular, the method according to the invention overcomes a widely used method in the field of the related art, wherein, the fluid atomisation technique, for example the water atomisation technique, could in no way be used to prepare nuclear metal or alloy particles.

The method according to the invention counters and overcomes this presumption, by means of its specific characteristics which precisely make it possible to apply fluid atomisation to nuclear metals or alloys.

It was clearly not easy to transpose this commonly applied technique to conventional metals and metal alloys and nuclear alloys, due to the extremely specific problems involved in the atomisation of these metals and alloys.

According to the method of the invention, oxidation of the metal or alloy is limited to a low level, by keeping the molten metal or alloy stream in an inert gas atmosphere, such as argon, generally with a controlled hygrometry, during melting and surrounding the metal or alloy stream, from melting, to the effective atomisation by an envelope or sheath of said inert gas.

Oxidation is also limited to a low level by applying, from the start of atomisation, an ultra-rapid quenching rate, generally $10^5$ to $10^6$ K/s on the particles created.

The envelope of inert gas is easily formed by ejecting the inert gas through an orifice surrounding the nozzle orifice, simultaneously with the ejection of the metal or alloy stream through said nozzle.

In addition, the use for the quick quenching of a low, finite quantity of quenching fluid, preferentially water, typically less than or equal to 2 litres has no effect on the criticality risks, while the separation of the melting area and the atomisation area plays a fundamental role in inhibiting, in all operation, normal or accidental situations, a significant quantity of metal or alloy from falling into the quenching fluid, such as water.

In other words, the method according to the invention makes it possible to prepare nuclear metal or alloy particles, such as UMo, particularly in powder form, particularly suitable for the production of nuclear fuel, complying with all the specific constraints related to the handling of nuclear materials.

Therefore, among other advantages, the method according to the invention makes it possible to prepare particles, particularly a powder, with a narrow particle size distribution, of particle sizes such that the subsequent nuclear fuel preparation steps are rendered easier.

The method according to the invention is characterised by a complete absence of nuclear material retention, complete correspondence of the production capacity with nuclear requirements, easy, reliable and inexpensive use, and, finally, a very low quantity of effluents.

The term nuclear metal or alloy according to the invention generally refers to any metal or alloy liable to be used or incorporated in a nuclear fuel.

Therefore, said metal or alloy should generally be selected from the actinides, such as uranium, the lanthanides and their alloys.

Of the uranium alloys, its alloys with molybdenum are preferred.

The invention also relates to a device to prepare nuclear metal or alloy particles comprising:
- means to prepare a fluid mass of the metal or alloy by melting;
- means to put the fluid mass of the metal or metal alloy in the form of a molten metal or alloy stream by ejecting the fluid mass of metal or alloy through a nozzle;
- means to impart a centrifugal rotation movement to a quenching fluid and carry out the atomisation of the molten metal or metal alloy stream particles and the quick quenching of the particles;
- means to melt the nuclear metal or metal alloy in an inert gas atmosphere, and means to surround the molten metal or metal alloy stream by a neutral gas envelope until quenching.

Advantageously, the device according to the invention also comprises means to separate the area wherein melting takes places physically from the area wherein atomisation takes place.

The invention will now be described in more detail in the following description, given for illustrative and non-limitative purposes, with reference to the figure attached, wherein:

FIG. 1 is a schematic sectional view of a device according to the invention.

The device according the invention is described in FIG. 1.

In some aspects, this device is similar to a conventional device to prepare particles by quick quenching and atomisation. Such a device is, for example, disclosed in the document EP A 00 43345. For example, it is possible to refer to this document to obtain a more detailed description of some elements of the device not specific to the present invention.

The device in FIG. 1 comprises means to activate a quenching fluid with a centrifugal rotation movement and carry out the quick quenching and the atomisation of the molten metal or alloy stream. These means are represented in FIG. 1 in the form of a substantially vertical shaft (1), to which a drum (2) is attached, or horizontal rotary bowl, substantially having the shape of a disk, said disk being attached at the centre of the base to said shaft by any known means (3), for example, by welding, bolt fastening, threading.

The shaft (1) is rotated (4) by suitable means, such as an electric motor (not shown). The disk is equipped at its circumference with a cylindrical wall (5) projecting vertically upwards and equipped at its top with a horizontal wall (6) projecting inwards over a short distance to form an edge.

The horizontal wall or edge and the vertical wall make it possible to contain a low finite (i.e. perfectly determined) quantity, for example of not more than 2 litres, of quenching fluid (7), such as water, which enables the atomisation and quick quenching of a molten metal or alloy stream.

The quenching fluid may be selected from any suitable liquids, but water is preferred ; the water may be supplemented with one or more adjuvants selected, for example, from electrolytic aqueous solutions or aqueous polymer solutions.

It may also be judicious to use liquid argon, for example.

The device according to the invention also comprises means to prepare, by melting, a fluid mass of molten metal or alloy. Said means are positioned in the opening (8) defined by said edge in the space left free by said edge. Said means are generally presented in the form of a fixed crucible (9), made of refractory material, of an overall cylindrical shape, wherein the main axis is inclined downwards, in the direction of the cylindrical wall of the drum. The crucible may be positioned at the centre of the disk, but it is preferentially positioned so as to be closer to the edge of said disk.

The lower end (10) of said crucible (9) is of an overall tapered shape of a gradually decreasing diameter up to an ejection nozzle provided at the centre of said tapered portion and directed towards the vertical cylindrical wall of the drum described above. The crucible is fixed and contains a metal or alloy mass of 0.1 to 5 kg. At the start of the method, this mass is present in the form of ingots, chips, grains or others.

The means to prepare, by melting, a fluid mass of the molten metal or alloy also comprise heating means (not shown), for example, in the form of an induction coil wound around the crucible. The term fluid mass refers to the fact that the viscosity of said mass alloys its easy flow and projection.

The device according to the invention comprises means to put the fluid mass of metal or metal alloy in the form of a molten metal or alloy stream.

In this way, it is possible, for this purpose, to apply an ejection pressure (12) on the surface of the fluid mass of molten metal or alloy (13), which forces the fluid mass through the nozzle at the base of the crucible and convert it into a stream (14), for example, cylindrical in shape, since the nozzle orifice generally has a circular cross-section.

For example, the diameter of the stream is low, for example, of the order of 50 to 200 µm, preferentially approximately 100 µm.

Advantageously, the ejection pressure applied is supplied by the inert gas, which forms the atmosphere wherein the melting is carried out and also forms the envelope or sheath surrounding the molten metal or alloy stream.

The molten metal or alloy stream may be a continuous stream, but preferentially it will consist of a discontinuous stream.

The device according to the invention also comprises means to melt the nuclear metal or metal alloy in an inert gas atmosphere and means to surround the molten metal or metal alloy stream with an envelope or sheath of inert gas from melting until quenching.

In this way, in FIG. 1, a pressurised argon stream or flux (12) is sent onto the free top surface area (15) of the molten metal or alloy mass, the argon stream or flux, as seen above, while maintaining said molten mass in an inert atmosphere, provides the pressure required to eject the fluid mass of molten metal or alloy through the nozzle orifice (11).

As the inert gas, any gas not reacting with the materials of the device and with the molten metal or alloy mass may be used. This gas may thus be selected from argon, nitrogen, helium.

The preferred gas is argon. Preferentially, the pressure of the gas is between 1 and 15 bar.

The means to surround the molten metal or alloy stream by an envelope of inert gas comprise means to eject the inert gas, so as to surround the molten metal or alloy stream which is ejected, through the nozzle located at the base of the crucible.

In this way, around the crucible, a fixed envelope or confinement (16) concentric with the crucible surrounding said crucible, of a shape roughly similar to that of the crucible, i.e., for example, a cylindrical and tapered envelope, also equipped with an orifice at its base wherein the shape is similar to that of the nozzle, may be provided.

In this way, if the nozzle has a circular orifice, the orifice of the envelope will also be circular with, however, a larger diameter than that of the nozzle orifice, so as to allow the molten metal or alloy stream to pass.

The crucible may be made of quartz or ceramics, for example, yttrium oxide.

The confinement, also referred to as the countercrucible, may be made of any suitable material, for example quartz or ceramics.

The pressurised inert gas, preferentially obtained from the same source as that supplying the gas providing the ejection pressure and the inert atmosphere in the crucible, passes into the area (18) defined between the crucible and the envelope, and then forms a stream, for example an annular stream (19) surrounding the metal or alloy stream (14) leaving the crucible nozzle.

The sheathed molten metal or alloy stream formed in this way passes through the orifice of the envelope surrounding the crucible, and the molten metal or alloy stream, still sheathed in the same way by an envelope of inert gas, continues its generally straight path until it strikes the screen of quenching fluid, such as water in rapid centrifugal movement. For example, the linear speed of the quenching fluid, such as water at the point of contact is 10 to 60 m/sec, for example, 40 m/sec.

At the point of contact, the envelope of inert gas surrounding the molten metal or alloy stream is deviated (20) while only the molten metal or alloy stream penetrates the water mass and is atomised and quenched rapidly, preferentially, at the speed already given above.

In this way, particles (21) are formed.

These particles (21) may be defined as a powder, i.e. their particle size distribution is preferentially 10 to 200 μm.

In addition, the particles have a narrow particle size distribution, for example, between 10 and 120 μm for particles of an average size of 60 μm.

The mass of powder obtained is generally 0.1 to 5 kg, which limits the criticality risks.

The powder obtained may be retrieved continuously or at the end of the method by means not shown.

In any case, the time required to atomise the molten mass contained in the crucible, which is generally 1 to 30 min, is short, for example from 1 to 15 min. In addition, the position of the nuclear material is located accurately at any time.

Advantageously, the device according to the invention, as shown in FIG. 1, comprises means to separate the area wherein melting takes place, i.e. essentially the crucible, physically from the area wherein atomisation takes place, i.e. essentially the quenching fluid activated by a centrifugal rotation movement.

The purpose of these means is to prevent a significant mass of molten metal or alloy from falling into the quenching fluid.

These means make it possible to ensure the complete separation of the melting. and atomisation areas in nominal, normal and also accidental operation, for example, in the event of crucible rupture.

These means essentially comprise a fixed diaphragm (22) essentially located under the crucible, said diaphragm roughly has a shape corresponding to that of the drum, i.e. a circular shape with inclined, rising edges (23) attached to fixed supports (24). One of said inclined edges is bored with an orifice (25) aligned with the orifices of the nozzle and envelope to allow the molten metal or alloy stream surrounded by its envelope of inert gas to pass.

The diaphragm is generally made of a metal such as copper coated with molybdenum or stainless steel and is, preferentially, cooled using known means, not shown.

In addition, it is possible to consider that the means to separate the melting area and the atomisation physically also comprise the counter-crucible, described above, which enables separation essentially during nominal installation operation.

According to the invention, a molten alloy or metal stream is created instead of a gravitational flow as in the prior art.

Creating an alloy stream and not using a gravitational flow offers the following advantages:

Firstly, the molten metal or metal alloy cannot flow gravitationally from the nozzle into the quenching fluid which makes it possible to work with highly reactive metals such as nuclear metal alloys.

Indeed, by converting the molten metal or metal alloy into stream form (i.e. by applying a pressure to the surface of the molten alloy metal bath, and ejecting through a nozzle, preferentially with a small diameter), the melting and quenching areas can advantageously be separated (see figure). Only a preferentially small diameter orifice (25) enables the passage of the stream. In the event of failure (for example due to partial blockage of the nozzle or crucible rupture), the molten metal or alloy will not flow gravitationally into the quenching bath (which could produce a violent reaction such as a vapour explosion) but will be retrieved in the fixed diaphragm (22). In the configuration in document JP A 55 054508, it is not possible to set up a passive safety device of this type.

In addition, the creation of a metal or alloy stream enables precise control of the molten metal or metal alloy supply of the method. Indeed, by converting the metal or alloy into stream form, direct control of the molten metal or metal alloy flow rate and the ejection state (which determines the morphology of the stream in terms of discontinuity and profile) is obtained. The gravitational flow of the alloy in the case of the Japanese Toyota document mentioned above does not make it possible to obtain this level of control since the flow rate and the morphology of the flow are dependent on the level of the bath of the melting crucible and random instabilities.

In our case, the effect of the variation in the level of the bath is negligible with respect to the effect of the pressure applied to the surface of the bath which is regulated.

In addition, the operation in stream form makes it possible to control the start and end of ejection completely by simple pressurisation and depressurisation.

However, the application of the method to nuclear metal alloys requires ejection procedure control possibilities which is not the case for the Toyota patent mentioned above.

Finally, the creation of a molten metal or alloy stream enables precise control of the particle size and makes it possible to obtain high particle fineness. The conversion of the molten metal or alloy into stream form makes it possible to obtain before the atomisation of the particles a continuous steam of a characteristic size close to 150 microns, for example. Then, the atomisation in contact with the quenching fluid (relative speed of 10 to 60 m/s, for example) makes it possible to obtain powders ranging typically from 50 to 200 microns in average diameter, for example.

In the Toyota patent, it is possible to consider that the orifices have a minimum diameter of the order of 0.5 mm minimum and the relative speed is relatively low (the walls of the quenching fluid are not vertical), 10 m/s maximum. In this case, the particles obtained will have a characteristic size, of the order of 500 microns, i.e. much higher than that required and with no possibility of reducing it.

Another essential characteristic of the method according to the invention is the creation of an envelope of inert gas surrounding the metal stream completely. This sheath of inert gas makes it possible, according to the invention, to have optimal protection of the stream without having to place the entire installation in neutral gas, which would be very costly in terms of machinery and operation. Indeed, the sheathing makes it possible to supply clean gas to surround the stream from the nozzle outlet (the hottest area and therefore the area where the molten metal or metal alloy is the most reactive) and subsequently maintain this protection.

In the case of the Toyota patent mentioned above, the gas is distributed at a significant distance from the molten metal or metal alloy and may therefore be contaminated before coming into contact with the stream by quenching fluid vapours or ambient air having entered through the visible openings of the confinement.

The invention claimed is:

1. A method of preparing particles of a metal or metal alloy suitable for use or incorporation into a nuclear fuel, comprising the steps of:
   a) melting a fluid mass of the metal or metal alloy in an inert gas atmosphere;
   b) converting the fluid mass of the metal or metal alloy into molten metal or metal alloy jet formed by ejecting the fluid mass of metal or alloy through a nozzle under pressure;
   c) providing an inert gas envelope surrounding the molten metal or metal alloy jet by ejecting an inert gas through an orifice that surrounds the orifice of the nozzle; and
   d) ejecting the molten metal or alloy jet into a quenching fluid imparted with a centrifugal rotation movement, whereby atomisation of the molten metal or metal alloy jet into particles and quenching of the particles are carried out.

2. The method according to claim 1, wherein the orifice through which the inert gas is ejected is centered on the nozzle orifice.

3. The method according to claim 1, wherein the quantity of quenching fluid is less than or equal to 2 litres.

4. The method according to claim 1, wherein the quenching fluid is water or liquid argon.

5. The method according to claim 1, wherein the area where melting takes place and the area where atomisation takes place are physically separated.

6. The method according to claim 1 wherein the metal is selected from the group consisting of actinides and lanthanides.

7. The method according to claim 6, wherein the metal is uranium.

8. A device for preparing particles of a metal or metal alloy suitable for use or incorporation into a nuclear fuel comprising:
   a) a means for melting a fluid mass of the metal or alloy;
   b) a means for putting the fluid mass of the metal or metal alloy in the form of a molten metal or alloy jet by ejecting the fluid mass of metal or alloy through a nozzle under pressure;
   c) a means for imparting a centrifugal rotation movement to a quenching fluid whereby the quenching fluid being capable of carrying out atomisation of the molten metal or metal alloy jet into particles and quenching of the particles; and,
   d) a means for providing an inert gas envelope to surround the molten metal or metal alloy jet.

9. The device according to claim 8, further comprising:
   e) a means for physically separating where melting places from where atomisation takes place.

10. The device according to claim 8, wherein the orifice through which the inert gas is ejected is circular.

11. The device according to claim 8, wherein the alloy is selected from the group consisting of actinide and lanthanide alloys.

12. The device according to claim 8, wherein the alloy is a uranium alloy.

13. The device according to claim 12, wherein the uranium alloy is a uranium alloy with molybdenum.

* * * * *